US012413993B2

(12) United States Patent
Elshafie et al.

(10) Patent No.: US 12,413,993 B2
(45) Date of Patent: Sep. 9, 2025

(54) TECHNIQUES FOR PROVIDING CHANNEL QUALITY FEEDBACK FOR ENHANCED RELIABILITY IN WIRELESS COMMUNICATIONS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/458,210

(22) Filed: Aug. 26, 2021

(65) Prior Publication Data

US 2022/0070711 A1 Mar. 3, 2022

Related U.S. Application Data

(60) Provisional application No. 63/072,034, filed on Aug. 28, 2020.

(51) Int. Cl.
*H04W 24/10* (2009.01)
*H04L 1/00* (2006.01)
(Continued)

(52) U.S. Cl.
CPC ........... *H04W 24/10* (2013.01); *H04L 1/0027* (2013.01); *H04L 1/0029* (2013.01);
(Continued)

(58) Field of Classification Search
CPC .... H04W 24/10; H04W 72/23; H04L 1/1812; H04L 1/189; H04L 5/0055; H04L 5/0057;
(Continued)

(56) References Cited

U.S. PATENT DOCUMENTS

| 10,735,070 B2 | 8/2020 | Wei et al. |
| 2015/0365925 A1* | 12/2015 | Fu ......................... H04W 72/21 370/329 |

(Continued)

FOREIGN PATENT DOCUMENTS

| WO | WO 2013/178187 | * 12/2013 | ............ H04W 72/04 |
| WO | 2017171306 A1 | 10/2017 | |

(Continued)

OTHER PUBLICATIONS

English translation of WO-2019057073-A1. Retreived from PE2E Search on Nov. 13, 2024. (Year: 2019).*

(Continued)

*Primary Examiner* — Omar J Ghowrwal
(74) *Attorney, Agent, or Firm* — Arent Fox LLP/Qualcomm Incorporated

(57) ABSTRACT

Aspects of the present disclosure provide techniques for communicating channel state information (CSI) reports. In some aspects, downlink resources can be monitored for reception of downlink signaling, a CSI report can be generated based on the reception of the downlink signaling, where the CSI report indicates CSI for each of multiple sub-bands of the downlink resources, and the CSI report can be transmitted with hybrid automatic repeat request (HARQ) acknowledgement or negative acknowledgement (ACK/NACK) feedback associated with the downlink signaling to facilitate retransmission with improved block error rate (BLER). In some aspects, a base station receiving the CSI report, or otherwise based on uplink signals, can determine transmission parameters for retransmission to facilitate the improved BLER.

27 Claims, 6 Drawing Sheets

(51) Int. Cl.
*H04L 1/1607* (2023.01)
*H04L 1/1812* (2023.01)
*H04L 1/1867* (2023.01)
*H04L 5/00* (2006.01)
*H04W 72/23* (2023.01)

(52) U.S. Cl.
CPC .......... *H04L 1/0031* (2013.01); *H04L 1/0036* (2013.01); *H04L 1/1671* (2013.01); *H04L 1/1812* (2013.01); *H04L 1/189* (2013.01); *H04L 5/0055* (2013.01); *H04L 5/0057* (2013.01); *H04W 72/23* (2023.01); *H04L 1/0003* (2013.01); *H04L 1/0009* (2013.01); *H04L 1/0026* (2013.01)

(58) Field of Classification Search
CPC ... H04L 1/0029; H04L 1/0003; H04L 1/0009; H04L 1/0027; H04L 1/0031; H04L 1/0036; H04L 1/1671; H04L 1/0026

USPC .......................................................... 370/329
See application file for complete search history.

(56) References Cited

U.S. PATENT DOCUMENTS

| | | | |
|---|---|---|---|
| 2016/0165575 A1* | 6/2016 | Park | H04W 72/1268 370/329 |
| 2018/0034526 A1* | 2/2018 | Lee | H04B 7/0647 |
| 2019/0058513 A1* | 2/2019 | Mizusawa | H04B 7/0617 |
| 2019/0239216 A1* | 8/2019 | Kundu | H04W 72/21 |

FOREIGN PATENT DOCUMENTS

| | | | |
|---|---|---|---|
| WO | WO-2019057073 A1 * | 3/2019 | H04B 7/0456 |
| WO | 2019160745 A1 | 8/2019 | |
| WO | 2020033134 A1 | 2/2020 | |

OTHER PUBLICATIONS

Huawei, et al., "CSI Feedback Enhancements", 3GPP Draft, 3GPP TSG RAN WG1 Meeting #102-e, R1-2005244, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 8, 2020 (Aug. 8, 2020), XP051917292, 4 Pages, Retrieved from the Internet: URL: https://ftp.3gpp.org/tsg_ran/WG1_RL1/TSGR1_102-e/Docs/R1-2005244.zip. R1-2005244.docx [Retrieved on Aug. 8, 2020] section 2 "A-CSI on PUCCH triggered by DL DCI" and Section 3 "Enhanced CSI feedback mode".
International Search Report and Written Opinion—PCT/US2021/048070—ISA/EPO—Dec. 10, 2021.

* cited by examiner

TECHNIQUES FOR PROVIDING CHANNEL QUALITY FEEDBACK FOR ENHANCED RELIABILITY IN WIRELESS COMMUNICATIONS

CLAIM OF PRIORITY UNDER 35 U.S.C. § 119

The present Application for Patent claims priority to Provisional Patent Application No. 63/072,034, entitled "TECHNIQUES FOR PROVIDING CHANNEL QUALITY FEEDBACK FOR URLLC RELIABILITY ENHANCEMENT" filed Aug. 28, 2020, which is assigned to the assignee hereof and hereby expressly incorporated by reference herein for all purposes.

TECHNICAL FIELD

The present disclosure relates to wireless communication systems, and more particularly, to techniques for providing channel quality feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for generating and transmitting channel state information (CSI) between the base station and the user equipment (UE) in response to reception of downlink packets. Specifically, in order to improve communication between the base station and the UE, the UE may provide CSI report that may be appended to the hybrid automatic repeat request (HARQ)/acknowledgement (ACK)-negative acknowledgement (NACK) feedback following the decoding of the PDSCH packet. In accordance with aspects of the present disclosure, the CSI report may be provided by the UE with respect to wide-band or sub-band of the channel. The specific characteristics of the CSI report that may be generated and transmitted by the UE (e.g., whether to provide a wide-band or sub-band report, and type of report) may be dictated by the base station via signals transmitted in radio resource control, media access control (MAC) control element (MAC-CE) signaling, or via a dynamic downlink control information (DCI) message.

In one example, an apparatus for wireless communication is provided that includes a transceiver, a memory configured to store instructions, and one or more processors communicatively coupled with the memory and the transceiver. The one or more processors are configured to execute the instructions to cause the apparatus to monitor downlink resources for a transmission received on a downlink channel, generate a channel state information (CSI) report based on the transmission received on the downlink channel, wherein the CSI report indicates CSI for each of multiple sub-bands of the downlink resources, and transmit a hybrid automatic repeat request (HARQ) acknowledgement or negative acknowledgement (ACK/NACK) feedback associated with the transmission received on the downlink channel along with the CSI report to a base station.

In another example, an apparatus for wireless communication is provided that includes a transceiver, a memory configured to store instructions, and one or more processors communicatively coupled with the memory and the transceiver. The one or more processors are configured to execute the instructions to cause the apparatus to receive, from a UE, feedback for a transmission to the UE on a downlink channel, generate, based on the feedback, a retransmission of the transmission to the UE using a transmission parameter that is based on at least one of a CSI report indicated in the feedback that corresponds to multiple sub-bands of the transmission to the UE, characteristics of uplink signaling from the UE, or a history of CSI reports from the UE, and transmit, to the UE, the retransmission based on the transmission parameter.

In another example, a method for wireless communications at a UE is provided that includes monitoring downlink resources for a transmission received on a downlink channel, generating a CSI report based on the transmission received on the downlink channel, wherein the CSI report indicates CSI for each of multiple sub-bands of the downlink resources, and transmitting a HARQ ACK/NACK feedback associated with the transmission received on the downlink channel along with the CSI report to a base station.

In another example, a method for wireless communications at a base station is provided that includes receiving, from a UE, feedback for a transmission to the UE on a downlink channel, generating, based on the feedback, a retransmission of the transmission to the UE using a transmission parameter that is based on at least one of a CSI report indicated in the feedback that corresponds to multiple sub-bands of the transmission to the UE, characteristics of uplink signaling from the UE, or a history of CSI reports from the UE, and transmitting, to the UE, the retransmission based on the transmission parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
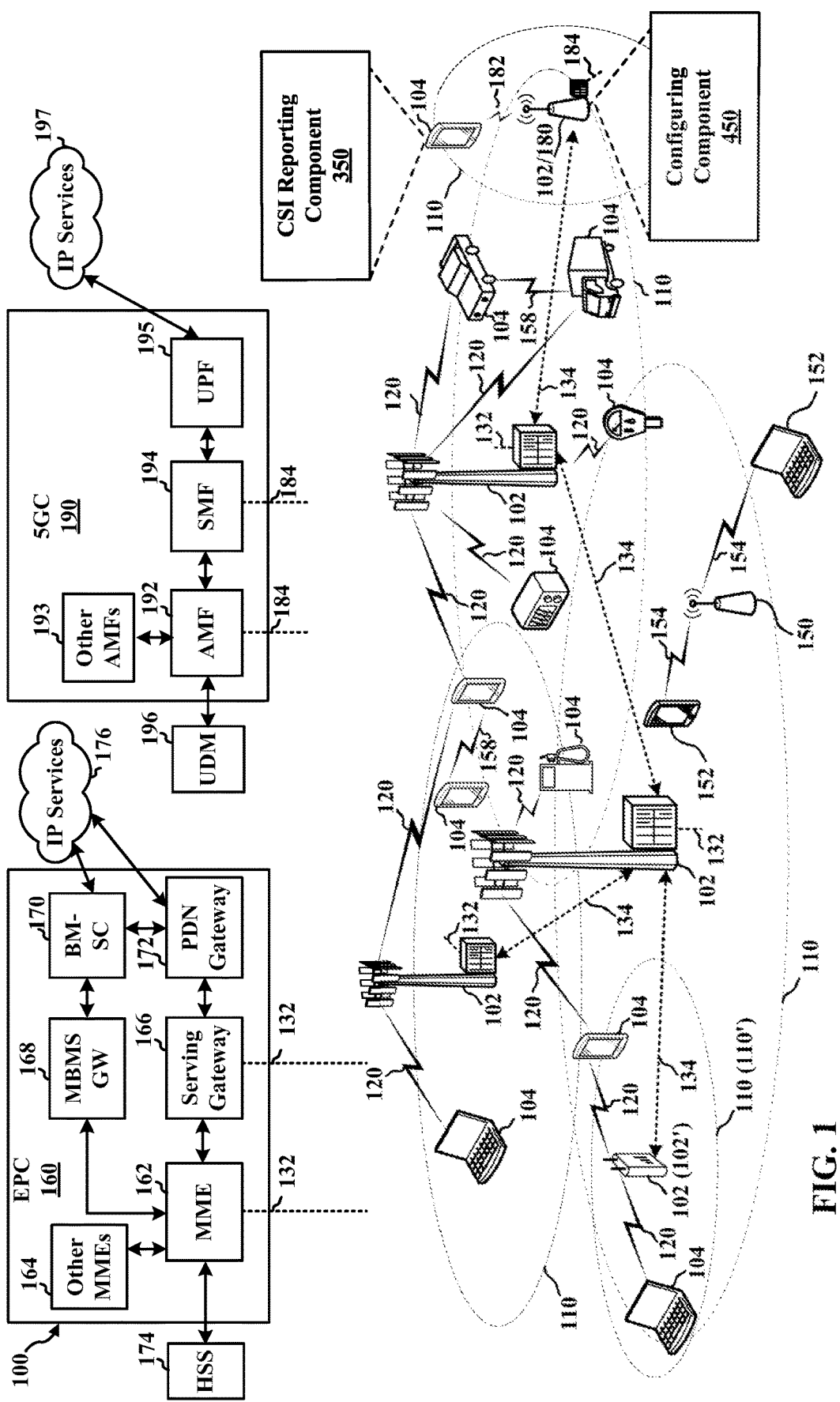
FIG. 1 is a schematic diagram of an example of a wireless communications system in accordance with aspects of the present disclosure.

Aspects described herein relate to reducing signaling overhead in reporting channel state information (CSI). In wireless communication systems, base stations may transmit downlink packets or signals or other transmissions to user equipment (UE). The downlink transmissions may include signals that may be transmitted on physical downlink shared channel (PDSCH), physical downlink control channel (PDCCH), or similar channels, and may include the downlink packets (e.g., downlink data), associated demodulation reference signals (DMRS), and/or the like. In response to downlink transmissions, or otherwise based on receiving the downlink transmissions, the UE may provide feedback to the base station, where the feedback may include a hybrid automatic repeat request (HARQ) acknowledgment or negative acknowledgment (ACK/NACK) feedback for each of the plurality of downlink transmissions or associated data or packets received at the UE. Specifically, the UE may provide HARQ-ACK/NACK feedback that includes ACK message (e.g., if the UE correctly decodes the received PDSCH/PDCCH signal) or a NACK message (e.g., if the UE fails to receive or decode the PDSCH/PDCCH signal). In an example, to improve communication between the base station and the UE, the UE may also provide a CSI report to the base station in response to receiving the downlink signals, or related packets or data. In one example, the UE may append the CSI report to the HARQ-ACK/NACK feedback following the decoding (or attempted decoding) of the PDSCH/PDCCH packet.

Based on the feedback received from the UE, which can include information regarding channel conditions, for example, the base station may more appropriately adjust or reconfigure the modulation and coding scheme (MCS), transmit power, or other transmission parameters for subsequent downlink transmissions (e.g., retransmissions), which can lead to improvement in the block error rate (BLER) of the downlink transmissions. Additionally, by including the CSI report along with the HARQ-ACK/NACK feedback, the communication between the UE and the base station may be improved because the base station may not have to wait for a dedicated time slot to receive a periodic CSI report. Indeed, the immediate feedback of channel conditions, sent as an aperiodic or asynchronous report, can facilitate reduction in the BLER (e.g., Target BLER=$1e^{(-4)}$) with a maximum of two HARQ transmissions per downlink transmission.

In some aspects, the CSI report may include, but is not limited to, CSI, channel quality indicator (CQI), signal-to-noise ratio (SNR), and/or spectral efficiency (SPEF) quality of the channel between the base station and the UE. Additionally, a UE can provide the CSI report with respect to wide-band or sub-band of the channel. Aspects described herein relate to reducing the number of bits used to report CSI for a plurality of RBs to reduce associated signaling overhead. In other aspects, the base station can adjust the MCS for retransmissions without a CSI report from the UE based on measurement of the UE's uplink channel statistics or report history. In either aspect, the reduction in reporting overhead can reduce resources needed to effectively communicate the CSI, which can improve communications between the UE and base station, and thus user experience when using the UE.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5 GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some UEs 104 of the wireless communication system may have a modem 314 and/or a CSI reporting component 350 (see FIG. 3) for transmitting CSI to the base station in response to reception of downlink packet. Specifically, the CSI reporting component 350 may generate and/or transmit channel condition information between the base station and the user equipment (UE) in response to reception of downlink packets. In order to improve communication between the base station and the UE, the CSI reporting component 350 may provide channel condition information report that may be appended to the HARQ-ACK/NACK feedback following the decoding of the PDSCH packet. In accordance with aspects of the present disclosure, the CSI report may be provided by the UE with respect to wide-band or sub-band of the channel. In addition, some base stations 102 of the wireless communication system may have a modem 414 and/or a configuring component 450 (see FIG. 4) for configuring or updating configuration of one or more transmission parameters for the UE 104, such as MCS, transmit power, etc. Though a UE 104 is shown as having the CSI reporting component 350 and a base station 102/gNB 180 is shown as having the configuring component 450, this is one illustrative example, and substantially any node or type of node may include a CSI reporting component 350 and/or a configuring component 450 for providing corresponding functionalities described herein The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FLASHLINQ®, WIMEDIA®, BLUETOOTH®, ZIGBEE®, WI-FI® (hereinafter "Wi-Fi") based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
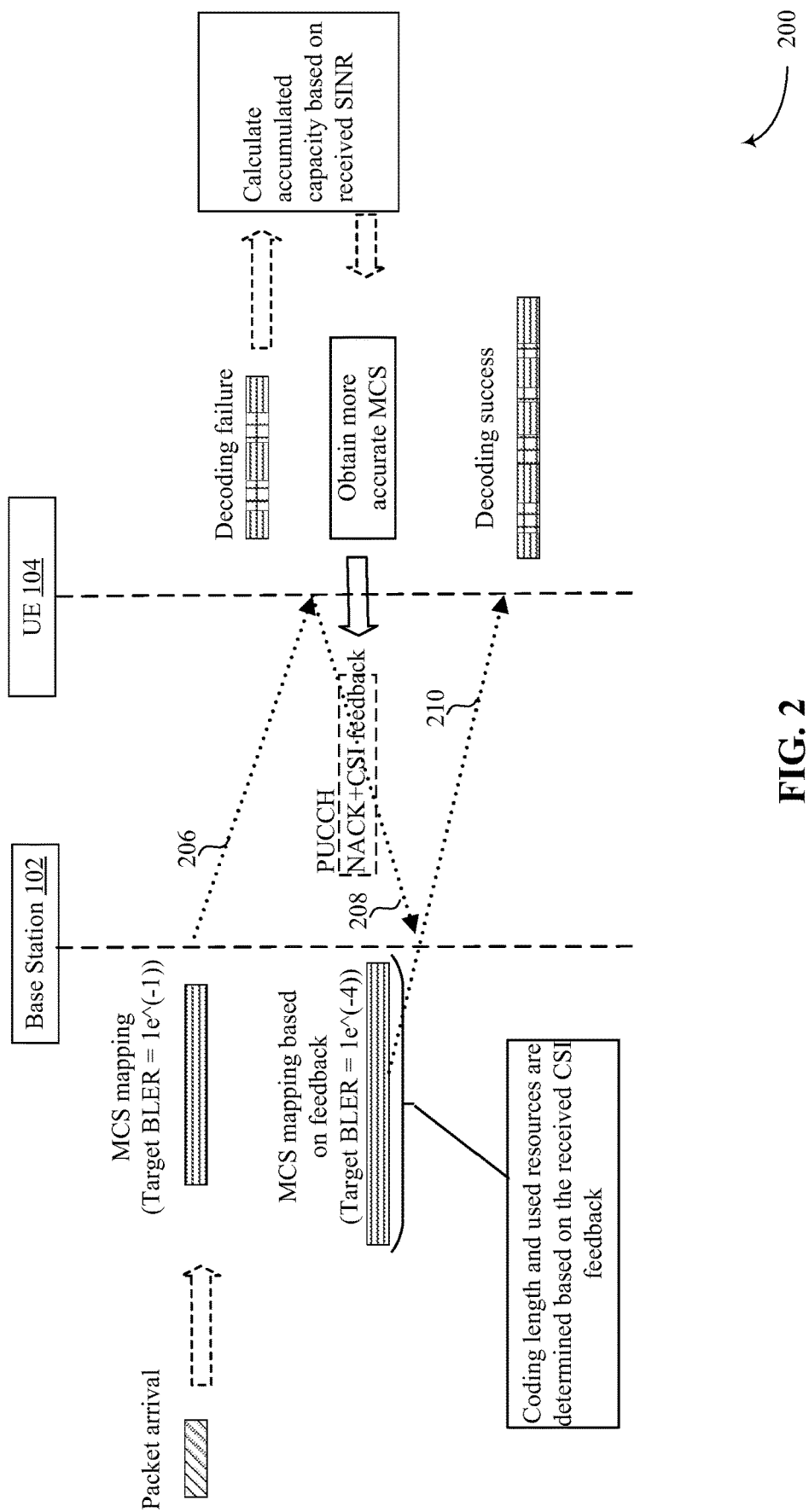
FIG. 2 is a call-flow diagram of an example of turbo-HARQ reporting in accordance with aspects of the present disclosure.

FIG. 2 is a call-flow diagram 200 of an example of turbo-HARQ reporting in accordance with aspects of the present disclosure. Call-flow diagram 200 depicts a base station 102 and a UE 104 that can transmit/receive wireless communications with one another. As noted above, in some examples, the base station 102 may transmit semi-persistent downlink packets or signals to the UE 104. The downlink transmissions may include packets or other data signals transmitted on PDSCH, PDCCH, etc. that may carry the downlink packets, associated DMRS (e.g., transmitted on PDSCH, PDCCH, etc.), and/or similar transmissions. In an example, base station 102 can transmit the downlink transmission using a first MCS mapping at 206. In response, the UE 104 may provide a HARQ-ACK/NACK feedback for each of the plurality of downlink transmissions received at the UE 104. Specifically, the UE 104 may provide HARQ-ACK/NACK feedback that includes ACK message (e.g., if the UE decodes the received PDSCH signal correctly) or a NACK message (e.g., if the UE fails to receive the PDSCH signal or fails to decode the received PDSCH signal correctly).

In order to improve communication between the base station 102 and the UE 104, the UE 104 may also provide CSI report to the base station in response to receiving the downlink packet. The CSI report may be appended to the HARQ-ACK/NACK feedback following the decoding of the PDSCH packet. By providing immediate feedback that includes information regarding channel conditions, the base station 102 may reconfigure the MCS, transmit power, and/or other transmission parameters for subsequent downlink transmissions (e.g., retransmissions). Additionally, by including the CSI report along with the HARQ-ACK/NACK feedback, the communication between the UE and the base station may be improved because the base station does not have to wait for a dedicated time slot to receive a periodic CSI report. Indeed, the immediate feedback of channel conditions may allow for reduction in BLER (e.g., Target BLER=$1e^{(-4)}$) with a maximum of two HARQ-ACK/NACK transmissions per downlink signal.

As shown at 208, the UE 104 can transmit the PUCCH NACK+CSI feedback to the base station 102. Based on receiving the NACK, base station 102 can determine a different MCS for retransmitting the downlink transmission to achieve a target BLER, and can retransmit the downlink transmission with the different MCS applied at 210. In an example, as described above and further herein, the base station 102 can determine the MCS to apply based on the CSI feedback. In accordance with aspects described herein, the CSI feedback can be indicated per sub-band and/or can be transmitted using a reduced number of bits. In addition, the UE 104 can determine the CSI or a more accurate MCS to be used by calculating accumulated capacity based on SINR of the received downlink signal, and can report the CSI or more accurate MCS to the base station 102 (e.g., with the HARQ feedback at 208). In accordance with other aspects described herein, the base station 102 can determine the MCS to apply based on based on other uplink channel statistics or report history. In either example, overhead associated with reporting CSI can be reduced.

In some aspects, the CSI report may include but is not limited to CSI, CQI, SNR, and/or SPEF quality of the channel between the base station 102 and the UE 104. Additionally, the CSI report may be provided by the UE with respect to wide-band or sub-band of the channel. The specific characteristics of the CSI report that may be generated and transmitted by the UE (e.g., whether to provide CSI, CQI, SNR, and/or SPEF or to provide a wide-band or sub-band report) may be dictated by the base station via signals transmitted in RRC signaling, MAC-CE signaling, or via a dynamic DCI message.

Where the base station may request CSI related to the sub-bands, the base station 102 and UE 104 may bundle or combine a plurality of resource blocks (RBs) into one or more sub-bands for generating and/or reporting the CSI. In such scenario, the UE 104 may provide, to the base station, the CSI feedback (e.g., CQI, SNR, SPEF) of each of the sub-bands. The sub-band resources may be defined by the starting resource block (e.g., an index of the starting resource block within a collection of frequency and/or time resources) and a total number of resource blocks per sub-band. Thus, in some instances, the base station 102 and the UE 104 may configure (or mutually agree on) reporting one or more bit(s) of quality indicator (e.g., CSI) for each sub-band, where the number of bits per sub-band may be configured by the base station 102 through RRC/MAC-CE or DCI.

In some aspects, the UE 104 may generate the CSI report based on either PDSCH transmission of a data packet (e.g., based on log likelihood ratios (LLRs)) or based on an associated DMRS signal. The CSI report may correspond to either wide-band or sub-band report. Thus, the base station 102 may enable or disable the sub-band reporting for PDSCH-based (e.g., based on LLR, bit-error-rate) or DMRS-based mode. The enablement or disablement of the sub-band report may be signaled by the base station 102 in a configuration over RRC/MAC-CE or dynamic DCI. Thus, in some instances, the base station 102 may request the CSI for a first mode (e.g., wide-band report) or a second mode (e.g., sub-band report).

When enabled, the UE 104 may also report the CSI of each sub-band separately or provide a differential CSI relative to the average CSI metric. With respect to differential CSI reporting, the bits associated with the CQI value of each sub-band may be encoded or compressed to a payload size configured or determined for the HARQ-ACK CSI signal (e.g., signal that appends the HARQ-ACK/NACK with the CSI report). Thus, where the total payload size of HARQ-ACK CSI signal is r bits (e.g., 3 bits) and the CQI value of sub-band i is CQI_i, the UE 104 may report K feedback bits (e.g., number of sub-bands*i bits for each sub-band). In some aspects, in order to decrease payload size, the UE may encode or compress the K bits into a payload size r bits (e.g., to increase the effective size of the feedback, where r bits is less than K bits). Alternatively, the UE 104 may also compute and report the average CSI (CQI, SNR, and/or SPEF) of all sub-bands using K bits and then using differential CSI reporting using a specified number of bits per sub-band to reduce the number of bits.

As a non-limiting example, the UE 104 may report a 1-bit differential CSI report that indicates whether the CSI offset (e.g., CSIaverage-CSI_i) is less than 0 or greater than 1 as illustrated in following table:

TABLE 1

| Differential CSI | CSI offset ($CSI_{average}$ − CSI_i) |
|---|---|
| 0 | <= 0 |
| 1 | >=1 |

For a 2-bit feedback, the differential relative to the average CSI (e.g., CQI/SNR/SPEF) may be reported by the UE 104 as follow:

TABLE 2

| Differential CSI | CSI offset ($CSI_{average}$ − CSI_i) |
|---|---|
| 0 | 0 |
| 1 | >=1 |
| 2 | −1 |
| 3 | <=−2 |

For a 3-bit feedback, the differential relative to the average CSI (e.g., CQI/SNR/SPEF) may be reported by the UE 104 as follow:

TABLE 3

| Differential CSI | CSI offset ($CSI_{average}$ − CSI_i) |
|---|---|
| 0 | 0 |
| 1 | 1 |
| 2 | 2 |
| 3 | >=3 |
| 4 | <=−4 |
| 5 | −1 |
| 6 | −2 |
| 7 | −3 |

It should be appreciated that above formats are only examples and other combination of bit size and parameters may be used to indicate the CSI feedback along with the HARQ-ACK/NACK feedback. Further, in some instances, the CSI may be reported by the UE to the base station with an ACK-only HARQ-ACK, NACK-only HARQ-ACK, or ACK/NACK HARQ-ACK feedback.

Figure 3:
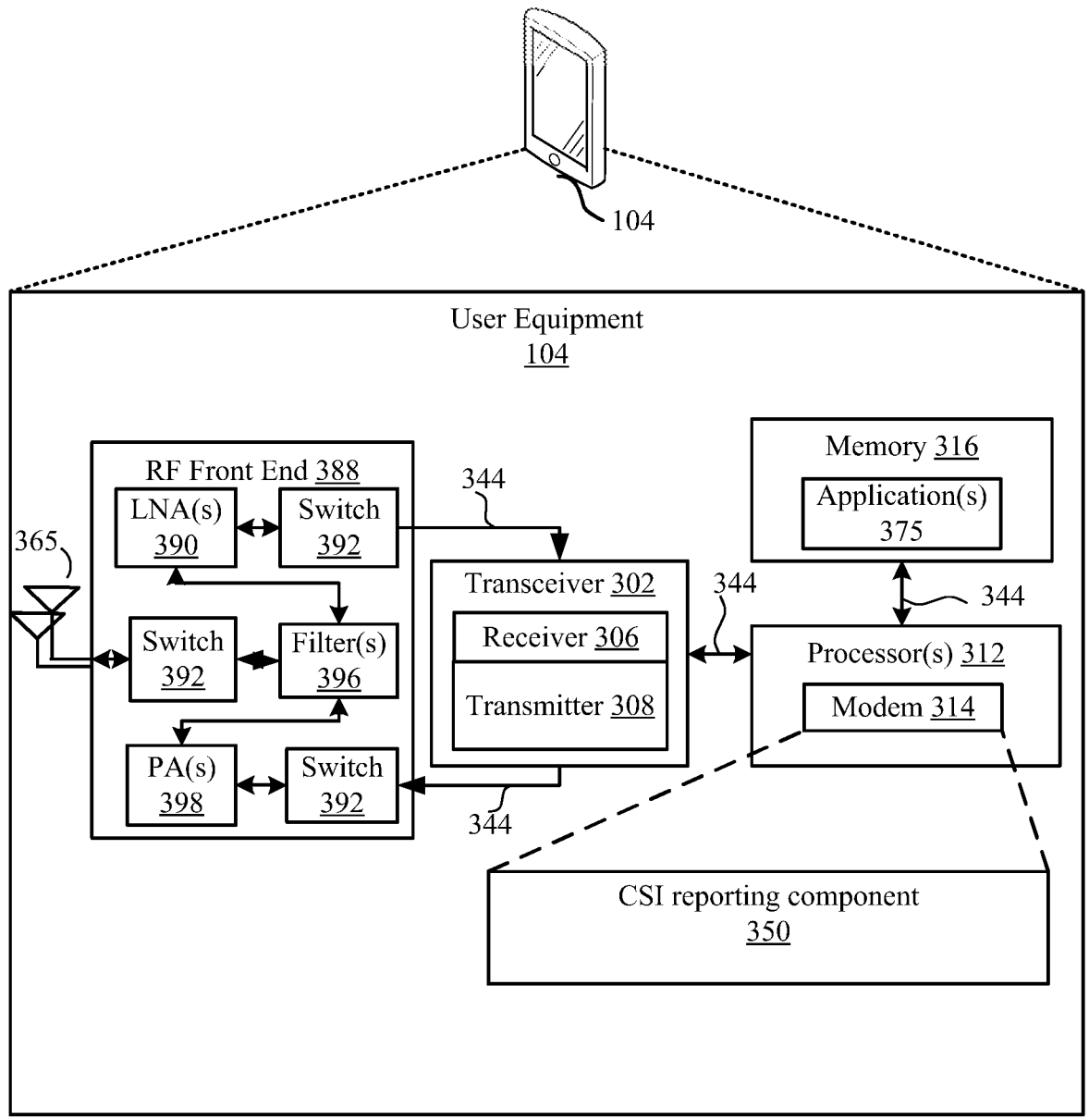
FIG. 3 is a schematic diagram of an example of implementation of various components of a user equipment in accordance with various aspects of the present disclosure.

FIG. 3 illustrates a hardware components and subcomponents of a device that may be a UE 104 for implementing one or more methods (e.g., method 500) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the CSI reporting component 350 to perform functions described herein related to including one or more methods (e.g., method 500) of the present disclosure. For example, the CSI reporting component 350 may generate and/or transmit CSI between the base station and the UE in response to reception of downlink packets. In order to improve communication between the base station and the UE, the CSI reporting component 350 may provide CSI report that may be appended to the HARQ-ACK/NACK feedback following receiving and/or decoding the PDSCH packet, receiving and/or decoding DMRS, etc. In accordance with aspects of the present disclosure, the CSI report may be provided by the UE with respect to wide-band or sub-band of the channel. The specific characteristics of the CSI report that may be generated and transmitted by the UE (e.g., whether to provide a wide-band or sub-band report, and type of report) may be dictated by the base station via signals transmitted in RRC signaling, MAC-CE signaling, or via a dynamic DCI message.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to CSI reporting component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with CSI reporting component 350 may be performed by transceiver 302.

The memory 316 may be configured to store data used herein and/or local versions of application(s) 375 or CSI reporting component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining CSI reporting component 350 and/or one or more of its subcomponents, and/or data associated therewith, when the UE 104 is operating at least one processor 312 to execute CSI reporting component 350 and/or one or more of its subcomponents.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 32.

As such, the transceiver 302 may be configured to transmit and receive wireless signals through one or more antennas 365 via the RF front end 388. In an aspect, the transceiver 302 may be tuned to operate at specified frequencies such that transmitting device can communicate with, for example, one or more base stations 102 or one or more cells associated with one or more base stations 102 or other UEs 104. In an aspect, for example, the modem 314 can configure the transceiver 302 to operate at a specified frequency and power level based on the configuration of the transmitting device and the communication protocol used by the modem 314.

In an aspect, the modem 314 can be a multiband-multimode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
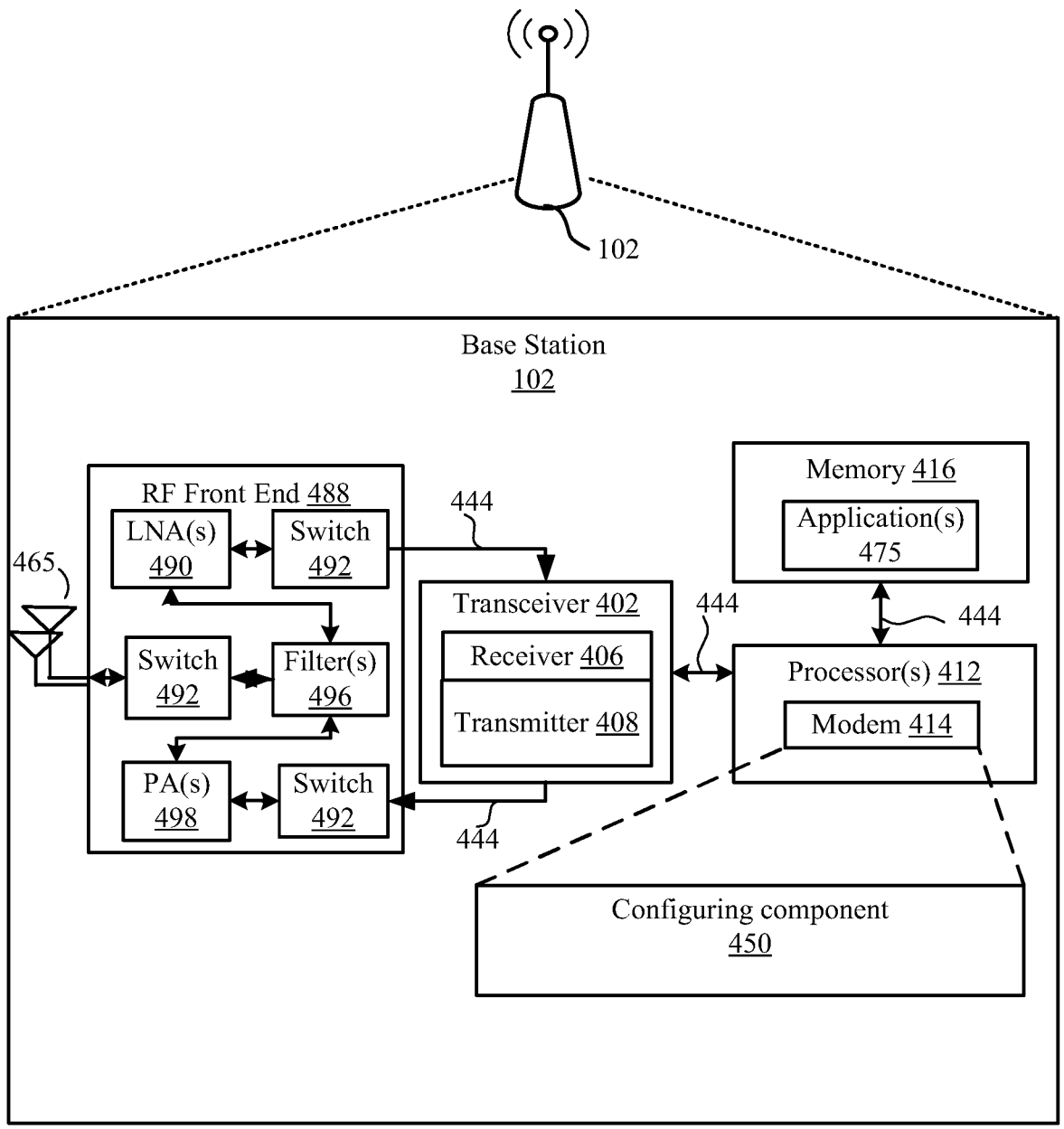
FIG. 4 is a flow diagram of an example of a method of wireless communication implemented by the UE in accordance with aspects of the present disclosure.

FIG. 4 illustrates a hardware components and subcomponents of a device that may be a base station 102 for implementing one or more methods (e.g., method 600) described herein in accordance with various aspects of the present disclosure. For example, one example of an implementation of the base station 102 may include a variety of components, some of which have already been described above, but including components such as one or more processors 412, memory 416 and transceiver 402 in communication via one or more buses 444, which may operate in conjunction with the configuring component 450 to perform functions described herein related to including one or more methods (e.g., method 600) of the present disclosure. For example, configuring component 450 ma configure or update one or more parameters, such as MCS, transmit power, etc., based on the CSI report received from the UE.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

Figure 5:
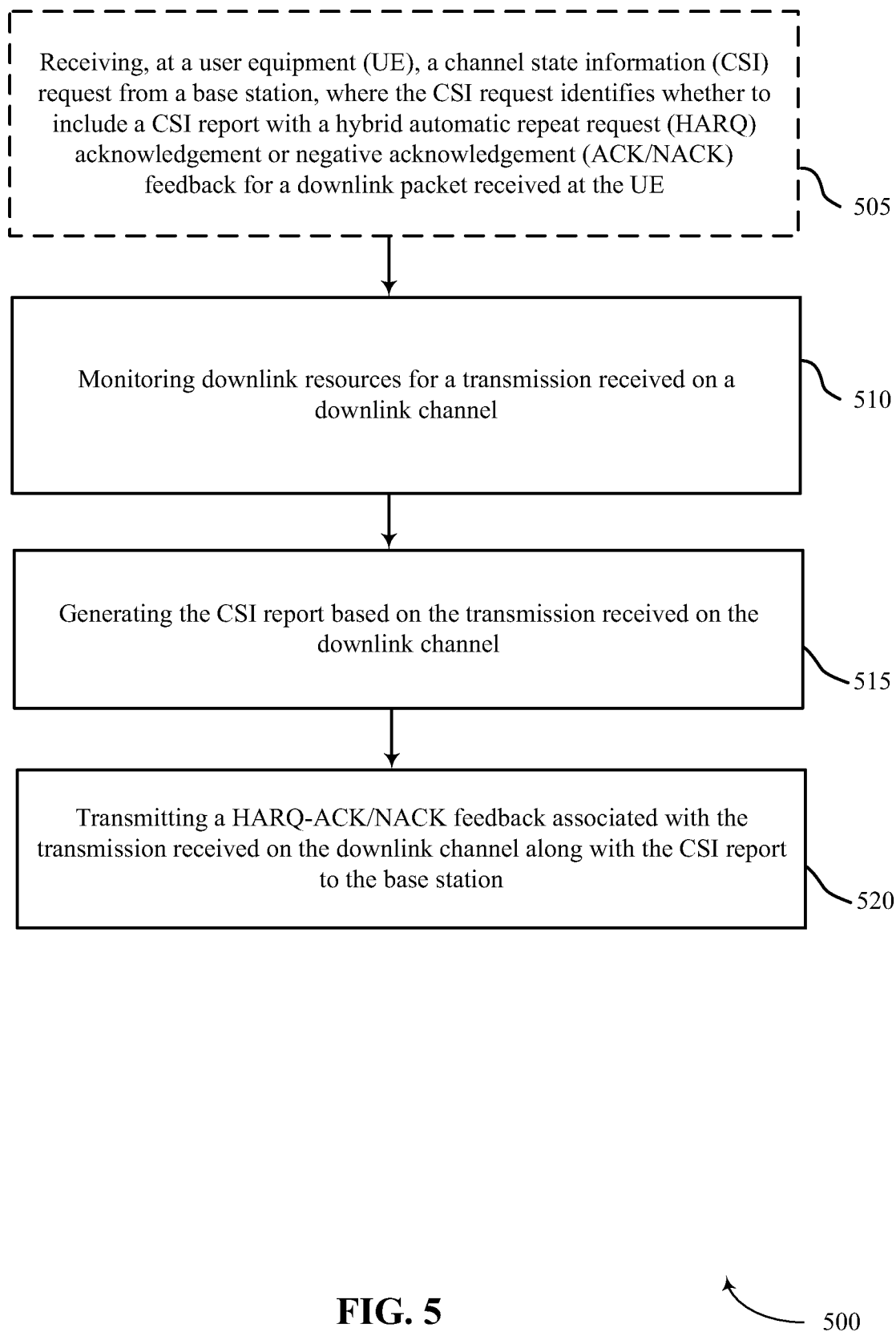
FIG. 5 is a schematic diagram of an example of implementation of various components of a base station in accordance with various aspects of the present disclosure.

Referring to FIG. 5, an example of a method 500 for wireless communications in accordance with aspects of the present disclosure may be performed by one or more UEs 104 discussed with reference to FIG. 1. Although the method 500 is described below with respect to the elements of the UE 104, other components may be used to implement one or more of the blocks or actions described herein.

At block 505, the method 500 may optionally include receiving, at a UE, a CSI request from a base station, where the CSI request identifies whether to include a CSI with a HARQ ACK/NACK feedback for a downlink packet received at the UE. In some examples, the CSI request may identify (e.g., via a one or multi-bit indicator) whether to enable wide-band reporting mode or a sub-band reporting mode, and/or parameters related to bundling multiple RBs into one or more sub-bands. In one aspect, the CSI request or other configuration may indicate, for sub-band reporting mode, reporting one (or a few) bits quality indicator for each sub-band, reporting an average CQI of the multiple sub-bands and/or a differential CQI for each sub-band, etc., as described above. In another aspect, the CSI request may identify (e.g., via a one or multi-bit indicator) whether to report CSI for PDSCH signaling and/or DMRS signaling. In some aspects, the CSI request may be received from the base station in one of a RRC signal, MAC-CE signal, or a dynamic DCI signal. Aspects of block 505 may be performed by the transceiver 302 and/or CSI reporting component 350 as described with reference to FIG. 3. Thus, in one example, CSI reporting component 350, transceiver 302, one or more antennas 365, modem 314, processor 312, and/or the UE 104 or one of its subcomponents may define the means for receiving, at a UE, a CSI request from a base station.

At block 510, the method 500 may include monitoring downlink resources for a transmission received on a downlink channel. For example, this can include monitoring a physical downlink shared channel (PDSCH), physical downlink control channel (PDCCH), or similar channel, for reception of a transmission, such as a downlink packet or other downlink data, an associated DMRS, etc. from the base station 102. Aspects of block 510 may be performed by CSI reporting component 350 as described with reference to FIG. 3. Thus, CSI reporting component 350, one or more antennas 365, modem 314, processor 312, and/or the UE 104 or one of its subcomponents may define the means for monitoring a physical downlink shared channel (PDSCH) for the transmission.

At block 515, the method 500 may include generating a CSI report based on the transmission received on the downlink channel (e.g., reception of the downlink packet DMRS, etc. on the PDSCH, PDCCH, etc.). For example, the CSI report can include CSI determined based on measuring signal power or quality of the transmission, as described herein. Moreover, as described herein, the CSI report can indicate CSI for each of multiple sub-bands of the transmission.

In some examples, generating the CSI report can include determining that the CSI request enables or otherwise configures sub-band reporting mode, determining, in response to enabling the sub-band reporting mode, that a plurality of RBs associated with a plurality of sub-bands are bundled together for reporting based on base station configuration, and generating the CSI report associated with the plurality of sub-bands that are bundled together for reporting.

In another example, generating the CSI report can include determining that the CSI request enables or otherwise configures sub-band reporting mode, and generating a separate CSI report for each of a plurality of sub-bands.

In yet another example, generating the CSI report can include determining that the CSI request enables or otherwise configures sub-band reporting mode, calculating an average CSI for a plurality of sub-bands, determining a differential CSI for each of the plurality of sub-bands relative to the average CSI of the plurality of sub-bands, and/or generating the CSI report based on the differential CSI for each of the plurality of sub-bands.

In some aspects, the CSI report may include one or more of CQI, SNR, or SPEF.

Aspects of block 510 may be performed by CSI reporting component 350 as described with reference to FIG. 3. Thus, CSI reporting component 350, modem 314, processor 312, and/or the UE 104 or one of its subcomponents may define the means for generating a CSI report between the base station and the UE in response to the received transmission.

At block 520, the method 500 may include transmitting a HARQ-ACK/NACK feedback associated with the transmission received on the downlink channel along with the CSI report to the base station. In some examples, transmitting the HARQ-ACK/NACK feedback associated with the downlink signaling along with the CSI report to the base station, can include transmitting the CSI report along with one of a ACK-only HARQ-ACK, NACK-only HARQ-ACK, or ACK/NACK HARQ-ACK feedback.

Aspects of block 505 may be performed by the transceiver 302 and CSI reporting component 350 as described with reference to FIG. 3. Thus, CSI reporting component 350, transceiver 302, one or more antennas 365, modem 314, processor 312, and/or the UE 104 or one of its subcomponents may define the means for transmitting a HARQ-ACK/NACK feedback associated with the transmission along with the CSI report to the base station.

Figure 6:
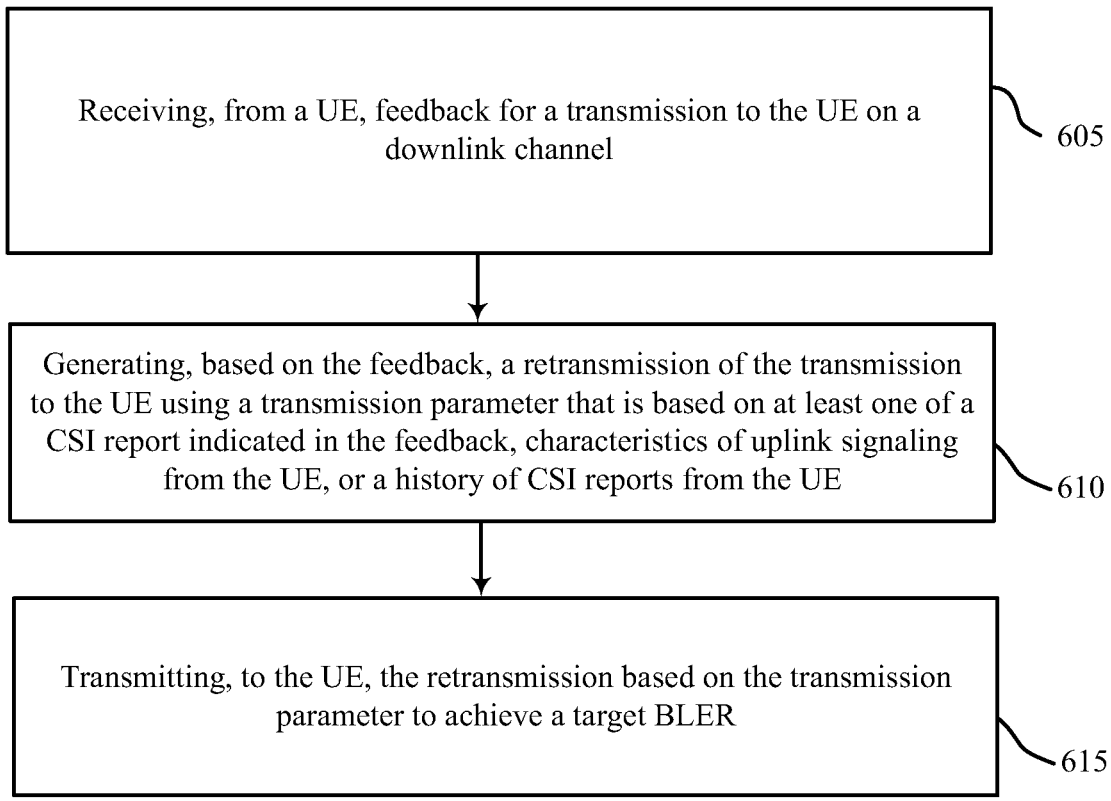
FIG. 6 is a flow diagram of an example of a method of wireless communication implemented by the base station in accordance with aspects of the present disclosure.

Referring to FIG. 6, an example of a method 600 for wireless communications in accordance with aspects of the present disclosure may be performed by one or more base stations 102 discussed with reference to FIG. 1. Although the method 600 is described below with respect to the elements of the base station 102, other components may be used to implement one or more of the blocks or actions described herein.

At block 605, the method 600 may include receiving, from a UE, feedback for a transmission to the UE on a downlink channel. For example, the feedback can include at least HARQ ACK/NACK feedback for a downlink transmission to the UE (e.g., a data packet, DMRS, etc. transmitted on a PDSCH,.PDCCH, etc.). In addition, the feedback may or may not include CSI feedback. Aspects of block 605 may be performed by the transceiver 402 and/or configuring component 450 as described with reference to FIG. 4. Thus, in one example, configuring component 450, transceiver 402, one or more antennas 465, modem 414, processor 412, and/or the base station 102 or one of its subcomponents may define the means for receiving the feedback from the UE.

At block 610, the method 600 may include generating, based on the feedback, a retransmission of the transmission to the UE using a transmission parameter (e.g., MCS, transmit power, etc.) that is based on at least one of a CSI report indicated in the feedback, characteristics of uplink signaling from the UE, or a history of CSI reports from the UE. For example, where the feedback includes the CSI report, as described above, configuring component 450 can select or otherwise determine the transmission parameter (e.g., MCS, transmit power, etc.) for the retransmission based on the CSI report to provide a target BLER for maximum of two HARQ transmissions. In this example, configuring component 450 can determine the CSI report from the feedback received at block 605 based on the CSI reporting process configured at the UE, which may be enabled by a CSI request sent to the UE by the base station. For example, the CSI reporting process can include reporting CSI for each of multiple sub-bands, which may include a quality indicator for each sub-band, a differential reporting for multiple sub-bands based on an average quality indicator, a reporting based on one or more of Tables 1, 2, or 3, as described above, or similar reporting tables, etc. In any case, configuring component 450 can determine the CSI for the multiple sub-bands based on the CSI report and determined CSI reporting process, and can accordingly determine the MCS for generating the retransmission.

In another example, where the feedback does not include the CSI report, base station 102 can determine the transmission parameter (e.g., MCS, transmit power, etc.) based on other parameters that may not require reporting, such to reduce the CSI reporting overhead. For example, configuring component 450 can determine the transmission parameter (e.g., MCS, transmit power, etc.) based on characteristics of uplink signaling. For example, characteristics of uplink signaling can correspond to uplink channel statistics measured from uplink signals received from the UE over a period of time. In another example, configuring component 450 can determine the transmission parameter (e.g., MCS, transmit power, etc.) based on a history of CSI reports received from the UE. In this regard, if the channel is time varying, the CSI feedback sent with HARQ ACK/NACK feedback may become stale, and thus in some examples, configuring component 450 may additionally or alternatively consider the uplink channel statistics (e.g., over a longer period of time) or history of UE CSI reports to conservatively select the MCS for retransmission. For example, the history of UE CSI reports may include periodic CSI reports such that the UE need not transmit CSI feedback aperiodically or asynchronously with the HARQ-ACK/NACK feedback.

Aspects of block 610 may be performed by the transceiver 402 and/or configuring component 450 as described with reference to FIG. 4. Thus, in one example, configuring component 450, transceiver 402, one or more antennas 465, modem 414, processor 412, and/or the base station 102 or one of its subcomponents may define the means for generating the retransmission of the downlink signaling.

At block 615, the method 600 may include transmitting, to the UE, the retransmission based on the transmission parameter (e.g., MCS, transmit power, etc.) to achieve the target BLER. Aspects of block 615 may be performed by the transceiver 402 and/or configuring component 450 as described with reference to FIG. 4. Thus, in one example, configuring component 450, transceiver 402, one or more antennas 465, modem 414, processor 412, and/or the base station 102 or one of its subcomponents may define the means for transmitting the retransmission to the UE.

The following aspects are illustrative only and aspects thereof may be combined with aspects of other embodiments or teaching described herein, without limitation.

Aspect 1 is a method for wireless communications including receiving, at a UE, a CSI request from a base station, wherein the CSI request identifies whether to include a CSI report with a HARQ ACK/NACK feedback for a downlink packet received at the UE, monitoring a PDSCH for reception of the downlink packet, generating the CSI report between the base station and the UE in response to the reception of the downlink packet over the PDSCH, and transmitting a HARQ-ACK/NACK feedback associated with the downlink packet along with the CSI report to the base station.

In Aspect 2, the method of Aspect 1 includes where the CSI request identifies whether to enable wide-band reporting mode or a sub-band reporting mode.

In Aspect 3, the method of Aspect 2 includes where generating the CSI report in response to the reception of the downlink packet over the PDSCH includes determining that the CSI request enables sub-band reporting mode, determining, in response to enabling the sub-band reporting mode, that a plurality of RBs associated with a plurality of sub-bands are bundled together for reporting based on base station configuration, and generating the CSI report associated with the plurality of sub-bands that are bundled together for reporting.

In Aspect 4, the method of any of Aspects 2 or 3 includes where generating the CSI report in response to the reception of the downlink packet over the PDSCH includes determining that the CSI request enables sub-band reporting mode, and generating a separate CSI report for each of a plurality of sub-bands.

In Aspect 5, the method of any of Aspects 2 to 4 includes where generating the CSI report in response to the reception of the downlink packet over the PDSCH includes determining that the CSI request enables sub-band reporting mode, calculating an average CSI for a plurality of sub-bands, determining a differential CSI for each of the plurality of sub-bands relative to the average CSI of the plurality of sub-bands, and generating the CSI report based on the differential CSI for each of the plurality of sub-bands.

In Aspect 6, the method of any of Aspects 1 to 5 includes where the CSI report includes one or more of CQI, SNR, or SPEF.

In Aspect 7, the method of any of Aspects 1 to 6 includes where the CSI request indication is received from the base station in one of a RRC signal, MAC-CE, or a dynamic DCI signal.

In Aspect 8, the method of any of Aspects 1 to 7 includes where transmitting the HARQ-ACK/NACK feedback associated with the downlink packet along with the CSI report to the base station includes transmitting the CSI report along with one of a ACK-only HARQ-ACK, NACK-only HARQ-ACK, or ACK/NACK HARQ-ACK feedback.

Aspect 9 is a method for wireless communications at a UE including monitoring downlink resources for a transmission received on a downlink channel, generating a CSI report based on the transmission received on the downlink channel, wherein the CSI report indicates CSI for each of multiple sub-bands of the downlink resources, and transmitting a HARQ ACK/NACK feedback associated with the transmission received on the downlink channel along with the CSI report to a base station.

In Aspect 10, the method of Aspect 9 includes where generating the CSI report includes determining to generate the CSI for each of the multiple sub-bands based on configuration of a sub-band reporting mode, determining that a plurality of RBs associated with the multiple sub-bands are bundled together for reporting based on a configuration, and generating the CSI report associated with the multiple sub-bands that are bundled together for reporting.

In Aspect 11, the method of any of Aspects 9 or 10 includes where generating the CSI report includes determining to generate the CSI for each of the multiple sub-bands based on configuration of a sub-band reporting mode, and generating the CSI report to include a separate CSI for each of the multiple sub-bands.

In Aspect 12, the method of any of Aspect 9 to 11 includes where generating the CSI report includes determining to generate the CSI for each of the multiple sub-bands based on configuration of a sub-band reporting mode, calculating an average CSI for the multiple sub-bands, determining a differential CSI for each of the multiple sub-bands relative to the average CSI, and generating the CSI report to include at least the differential CSI for each of the multiple sub-bands.

In Aspect 13, the method of any of Aspects 9 to 12 includes where transmitting the HARQ-ACK/NACK feedback associated with the transmission on the downlink channel along with the CSI report includes determining one or more decoding success or fail outcomes based on an attempt to decode the transmission received on the downlink channel, and transmitting the CSI report along with, based on the one or more decoding success or fail outcomes, one of a ACK-only HARQ-ACK, NACK-only HARQ-ACK, or ACK/NACK HARQ-ACK feedback.

In Aspect 14, the method of any of Aspects 9 to 13 includes receiving a CSI request from the base station, wherein the CSI request identifies whether to include the CSI report with the HARQ-ACK/NACK feedback for the transmission received on the downlink channel.

In Aspect 15, the method of Aspect 14 includes where the CSI request is received from the base station in one of a RRC signal, MAC-CE signal, or a dynamic DCI signal.

In Aspect 16, the method of any of Aspects 9 to 15 includes where the transmission received on the downlink channel includes a downlink data signal or a DMRS received in a PDSCH.

Aspect 17 is a method for wireless communications at a base station including receiving, from a UE, feedback for a transmission to the UE on a downlink channel, generating, based on the feedback, a retransmission of the transmission to the UE using a transmission parameter that is based on at least one of a CSI report indicated in the feedback that corresponds to multiple sub-bands of the transmission to the UE, characteristics of uplink signaling from the UE, or a history of CSI reports from the UE, and transmitting, to the UE, the retransmission based on the transmission parameter.

In Aspect 18, the method of Aspect 17 includes where the transmission parameter is based on the characteristics of uplink signaling from the UE determined over a period of time.

In Aspect 19, the method of any of Aspects 17 or 18 includes where the transmission parameter includes one or more of a modulation and coding scheme or transmit power.

In Aspect 20, the method of any of Aspects 17 to 19 includes where the CSI report indicated in the feedback includes a CSI report associated with the multiple sub-bands that are bundled together for reporting.

In Aspect 21, the method of any of Aspects 17 to 20 includes where the CSI report indicated in the feedback includes a separate CSI for each of the multiple sub-bands.

In Aspect 22, the method of any of Aspects 17 to 21 includes where the CSI report indicated in the feedback includes at least differential CSI for each of the multiple sub-bands as related to an average CSI.

In Aspect 23, the method of any of Aspects 17 to 22 includes transmitting, to the UE, a CSI request that identifies whether to include the CSI report with the feedback for the downlink signaling.

In Aspect 24, the method of any of Aspects 17 to 23 includes where the transmission includes a downlink data signal or a DMRS received in a PDSCH.

Aspect 25 is an apparatus for wireless communication including a transceiver, a memory configured to store instructions, and one or more processors communicatively coupled with the memory and the transceiver, where the one or more processors are configured to execute the instructions to cause the apparatus to perform one or more of the methods of any of Aspects 1 to 24.

Aspect 26 is an apparatus for wireless communication including means for performing one or more of the methods of any of Aspects 1 to 24.

Aspect 27 is a computer-readable medium including code executable by one or more processors for wireless communications, the code including code for performing one or more of the methods of any of Aspects 1 to 24.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WIMAX®), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the memory and the transceiver, wherein the one or more processors are configured to execute the instructions to cause the apparatus to:
      monitor downlink resources for a transmission received on a downlink channel, wherein the transmission received on the downlink channel includes at least one of a downlink data signal or a demodulation reference signal (DMRS) received in a physical downlink shared channel (PDSCH);
      measure channel state information (CSI) of the transmission over each of multiple sub-bands of the downlink resources including measuring a first CSI of the transmission over a first sub-band of the multiple sub-bands and measuring a second CSI of the transmission over a second sub-band of the multiple sub-bands;
      generate a CSI report for the transmission, wherein the CSI report indicates the CSI for the multiple sub-bands of the downlink resources; and
      transmit a hybrid automatic repeat request (HARQ) acknowledgement or negative acknowledgement (ACK/NACK) feedback associated with the transmission received on the downlink channel along with the CSI report to a base station.

2. The apparatus of claim 1, wherein the one or more processors are configured to execute the instructions to cause the apparatus to generate the CSI report at least in part by:
   determining to generate the CSI report for each of the multiple sub-bands based on configuration of a sub-band reporting mode;
   determining that a plurality of resource blocks (RBs) associated with the multiple sub-bands are bundled together for reporting based on a configuration; and
   generating the CSI report associated with the multiple sub-bands that are bundled together for reporting.

3. The apparatus of claim 1, wherein the one or more processors are configured to execute the instructions to cause the apparatus to generate the CSI report at least in part by:
   determining to generate the CSI report for each of the multiple sub-bands based on configuration of a sub-band reporting mode; and
   generating the CSI report to include a separate CSI for each of the multiple sub-bands.

4. The apparatus of claim 1, wherein the one or more processors are configured to execute the instructions to cause the apparatus to generate the CSI report at least in part by:
   determining to generate the CSI report for each of the multiple sub-bands based on configuration of a sub-band reporting mode;
   calculating an average CSI for the multiple sub-bands;
   determining a differential CSI for each of the multiple sub-bands relative to the average CSI; and
   generating the CSI report to include at least the differential CSI for each of the multiple sub-bands.

5. The apparatus of claim 1, wherein the one or more processors are configured to execute the instructions to cause the apparatus to transmit the HARQ-ACK/NACK feedback associated with the transmission on the downlink channel along with the CSI report at least in part by:
   determining one or more decoding success or fail outcomes based on an attempt to decode the transmission received on the downlink channel; and
   transmitting the CSI report along with, based on the one or more decoding success or fail outcomes, one of a ACK-only HARQ-ACK, NACK-only HARQ-ACK, or ACK/NACK HARQ-ACK feedback.

6. The apparatus of claim 1, wherein the one or more processors are configured to execute the instructions to cause the apparatus to receive a CSI request from the base station, wherein the CSI request identifies whether to include the CSI report with the HARQ-ACK/NACK feedback for the transmission received on the downlink channel.

7. The apparatus of claim 6, wherein the CSI request is received from the base station in one of a radio resource control (RRC) signal, media access control (MAC) control element (CE) signal, or a dynamic downlink control information (DCI) signal.

8. An apparatus for wireless communication, comprising:
   a transceiver;
   a memory configured to store instructions; and
   one or more processors communicatively coupled with the memory and the transceiver, wherein the one or more processors are configured to execute the instructions to cause the apparatus to:
      receive, from a user equipment (UE), feedback for a transmission to the UE on a downlink channel, wherein the transmission includes a downlink packet transmitted in at least one of a downlink data signal or a demodulation reference signal (DMRS) in a physical downlink shared channel (PDSCH), wherein the feedback includes a channel state information (CSI) report that indicates a first CSI of the transmission measured over a first sub-band of multiple sub-bands of downlink resources corresponding to the transmission and a second CSI of the transmission measured over a second sub-band of the multiple sub-bands;
      generate, based on the feedback, a retransmission of the transmission to the UE using a transmission parameter that is based on at least one of the CSI report, characteristics of uplink signaling from the UE, or a history of CSI reports from the UE; and
      transmit, to the UE, the retransmission based on the transmission parameter.

9. The apparatus of claim 8, wherein the transmission parameter is based on the characteristics of uplink signaling from the UE determined over a period of time.

10. The apparatus of claim 8, wherein the transmission parameter includes one or more of a modulation and coding scheme or transmit power.

11. The apparatus of claim 8, wherein the CSI report indicated in the feedback includes a CSI report associated with the multiple sub-bands that are bundled together for reporting.

12. The apparatus of claim 8, wherein the CSI report indicated in the feedback includes a separate CSI for each of the multiple sub-bands.

13. The apparatus of claim 8, wherein the CSI report indicated in the feedback includes at least differential CSI for each of the multiple sub-bands as related to an average CSI.

14. The apparatus of claim 8, wherein the one or more processors are further configured to execute the instructions to cause the apparatus to transmit, to the UE, a CSI request that identifies whether to include the CSI report with the feedback for the transmission.

15. A method for wireless communications at a user equipment (UE), comprising:
monitoring downlink resources for a transmission received on a downlink channel, wherein the transmission received on the downlink channel includes at least one of a downlink data signal or a demodulation reference signal (DMRS) received in a physical downlink shared channel (PDSCH);
measuring channel state information (CSI) of the transmission over each of multiple sub-bands of the downlink resources including measuring a first CSI of the transmission over a first sub-band of the multiple sub-bands and measuring a second CSI of the transmission over a second sub-band of the multiple sub-bands;
generating a CSI report based on the transmission, wherein the CSI report indicates the CSI for the multiple sub-bands of the downlink resources; and
transmitting a hybrid automatic repeat request (HARQ) acknowledgement or negative acknowledgement (ACK/NACK) feedback associated with the transmission received on the downlink channel along with the CSI report to a base station.

16. The method of claim 15, wherein generating the CSI report comprises:
determining to generate the CSI report for each of the multiple sub-bands based on configuration of a sub-band reporting mode;
determining that a plurality of resource blocks (RBs) associated with the multiple sub-bands are bundled together for reporting based on a configuration; and
generating the CSI report associated with the multiple sub-bands that are bundled together for reporting.

17. The method of claim 15, wherein generating the CSI report comprises:
determining to generate the CSI report for each of the multiple sub-bands based on configuration of a sub-band reporting mode; and
generating the CSI report to include a separate CSI for each of the multiple sub-bands.

18. The method of claim 15, wherein generating the CSI report comprises:
determining to generate the CSI report for each of the multiple sub-bands based on configuration of a sub-band reporting mode;
calculating an average CSI for the multiple sub-bands;
determining a differential CSI for each of the multiple sub-bands relative to the average CSI; and
generating the CSI report to include at least the differential CSI for each of the multiple sub-bands.

19. The method of claim 15, wherein transmitting the HARQ-ACK/NACK feedback associated with the transmission on the downlink channel along with the CSI report comprises:
determining one or more decoding success or fail outcomes based on an attempt to decode the transmission received on the downlink channel; and
transmitting the CSI report along with, based on the one or more decoding success or fail outcomes, one of a ACK-only HARQ-ACK, NACK-only HARQ-ACK, or ACK/NACK HARQ-ACK feedback.

20. The method of claim 15, further comprising receiving a CSI request from the base station, wherein the CSI request identifies whether to include the CSI report with the HARQ-ACK/NACK feedback for the transmission received on the downlink channel.

21. The method of claim 20, wherein the CSI request is received from the base station in one of a radio resource control (RRC) signal, media access control (MAC) control element (CE) signal, or a dynamic downlink control information (DCI) signal.

22. A method for wireless communications at a base station, comprising:
receiving, from a user equipment (UE), feedback for a transmission to the UE on a downlink channel, wherein the transmission includes a downlink packet transmitted in at least one of a downlink data signal or a demodulation reference signal (DMRS) received in a physical downlink shared channel (PDSCH), wherein the feedback includes a channel state information (CSI) report that indicates a first CSI of the transmission measured over a first sub-band of multiple sub-bands of downlink resources corresponding to the transmission and a second CSI of the transmission measured over a second sub-band of the multiple sub-bands;
generating, based on the feedback, a retransmission of the transmission to the UE using a transmission parameter that is based on at least one of the CSI report, characteristics of uplink signaling from the UE, or a history of CSI reports from the UE; and
transmitting, to the UE, the retransmission based on the transmission parameter.

23. The method of claim 22, wherein the transmission parameter is based on the characteristics of uplink signaling from the UE determined over a period of time.

24. The method of claim 22, wherein the transmission parameter includes one or more of a modulation and coding scheme or transmit power.

25. The method of claim 22, wherein the CSI report indicated in the feedback includes a CSI report associated with the multiple sub-bands that are bundled together for reporting.

26. The method of claim 22, wherein the CSI report indicated in the feedback includes a separate CSI for each of the multiple sub-bands.

27. The method of claim 22, wherein the CSI report indicated in the feedback includes at least differential CSI for each of the multiple sub-bands as related to an average CSI.

* * * * *